Patented July 28, 1925.

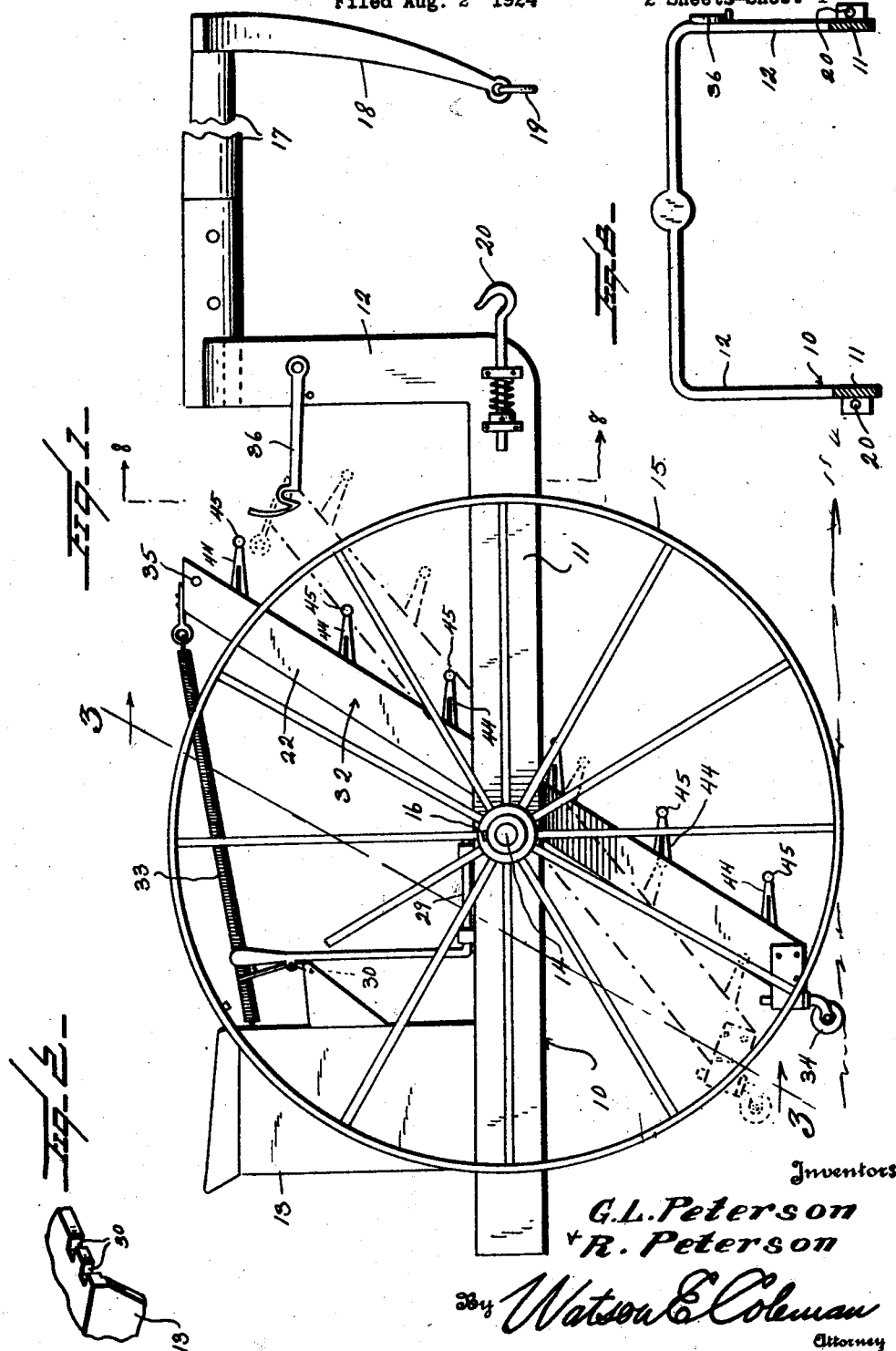

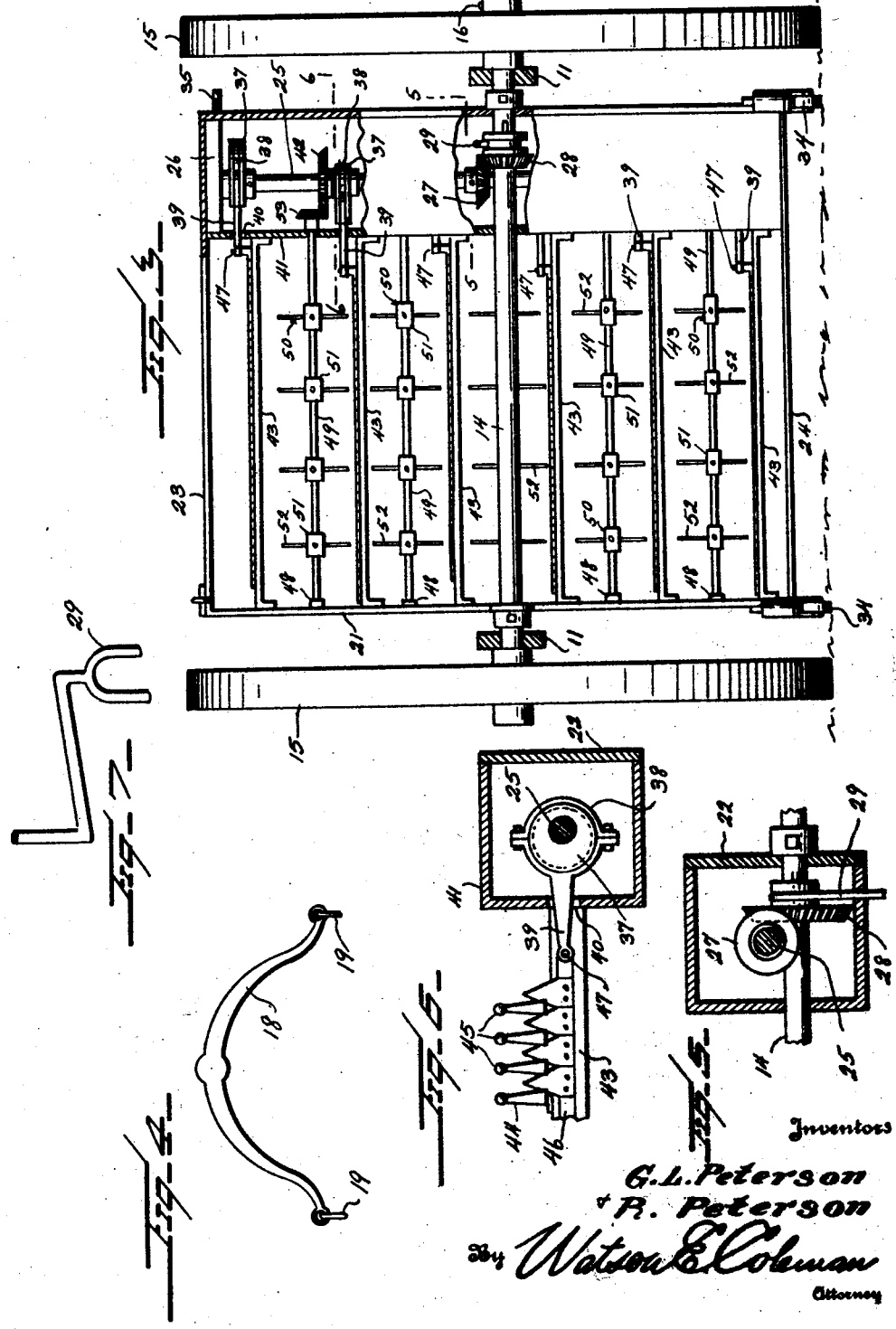

1,547,954

UNITED STATES PATENT OFFICE.

GEORGE LEE PETERSON AND ROY PETERSON, OF VIDALIA, GEORGIA.

STALK CUTTER.

Application filed August 2, 1924. Serial No. 729,749.

*To all whom it may concern:*

Be it known that we, GEORGE LEE PETERSON and ROY PETERSON, citizens of the United States, residing at Vidalia, in the county of Toombs and State of Georgia, have invented certain new and useful Improvements in Stalk Cutters, of which the following is a specification, reference being had to the accompanying drawings.

This invention relates to stalk cutters and more particularly to a device of this character for cutting green or dry cotton or corn stalks into very small particles.

An important object of the invention is to provide a device of this character which attacks the stalk which is to be severed from the top, successively cutting off sections of the stalk so that the stalk is firmly held until the lowest or final section is cut therefrom.

A still further object of the invention is to provide a device of this character which may be very simply and cheaply produced and which will be durable and efficient in service.

These and other objects we attain by the construction shown in the accompanying drawings, wherein for the purpose of illustration is shown a preferred embodiment of our invention and wherein:—

Figure 1 is a side elevation of a stalk cutter constructed in accordance with our invention, the cutter frame being shown in solid lines in operative position and in dotted lines in inoperative position;

Figure 2 is a detail perspective of the foot-board showing the notches for engagement by the shifting fork;

Figure 3 is a transverse section on the line 3—3 of Figure 1 parts being broken away;

Figure 4 is a front elevation of the yoke;

Figure 5 is an enlarged section on the line 5—5 of Figure 3;

Figure 6 is a similar section on the line 6—6 of Figure 3;

Figure 7 is a perspective of the shifting yoke.

Figure 8 is a section on a reduced scale through Figure 1 on the line 8—8.

Referring now more particularly to the drawings, the numeral 10 generally indicates a frame including side members 11 connected at their forward ends by an upwardly bowed arch 12, and at their rear ends by a seat structure 13 which they support. Directed through the side members is an axle 14 having supporting wheels 15, one of which is secured to the axle, as indicated at 16. The central portion of the bowed connector 12 is provided with a forwardly extending tongue 17, the forward end of which is provided with a downwardly bowed member 18, the ends of which, as at 19, are adapted for engagement with the neck yokes of the draft animals. The side members 11 have yieldably mounted thereon single-tree hooks 20 to assist in the attachment of the draft animals. Pivotally secured to the axle 14, intermediate their ends, are forwardly and upwardly inclining side members 21 and 22 connected at their upper and lower ends by transverse supports 23 and 24. A shaft 25 has its ends journaled in bearings 26 carried by the transverse members 23 and 24 and is provided in alignment with the axle with a skew-gear 27. Splined to the axle is a skew-gear 28 shifted by a lever-operated shifting fork 29, the lever of which is operatively held in adjusted position by coaction with notches 30 formed in the foot-boards of the machine and adapted to receive the spring catch and hold the lever with the gear in either engaged or disengaged position. The seat 13 is connected with the upper end of the tilting frame 32, formed by the members 21, 22, 23 and 24, by a spring 33 tending to draw the upper end of the frame rearwardly. The lower end of the frame has mounted thereon rollers 34 adapted to engage the ground and normally maintained in engagement with the ground by means of the spring 33. The side member 22 has projecting therefrom a pin 35 coacting with a hook 36 carried by one of the arms of the bowed front member 12 to hold the front end of the frame forwardly and the lower end thereof, and more particularly the rollers of the lower end, out of engagement with the ground.

Secured to the shaft at spaced intervals are eccentrics 37, the working faces of which are grooved for the reception of straps 38 having arms 39 operating through openings 40 formed in a cover plate 41 secured to the inner face of the side member 22 enclosing the shaft and eccentrics. Secured to the shaft, intermediate the eccentrics, are beveled gears 42. Supported at one end from the side member 21 and at the opposite end from the cover plate 41 are cutter bars 43, points of the guards 44 of which are blunted preferably by forming the end thereof in the shape of a ball, as indicated at 45, so that these guides will not tend to stick into soft leaves or stalks and the like and clog the action of the machine. The knife bar 46 is attached at one end to an aligned eccentric strap arm 39, as indicated at 47.

Journaled in bearings 48 carried by the side member 21 and by the cover plate 40 are shafts 49, to which at spaced intervals are secured kicker members 50, each comprising a collar 51 secured to the shaft having radiating therefrom a plurality of kicker fingers 52. The inner ends of these shafts, or those ends projecting into the housing formed by the member 22 and cover plate 41, are provided with beveled pinions 53 meshing with the beveled gears 42.

The operation of the device is as follows: Upon arrival at a field in which the stalks are to be cut, the frame is released from the hook 36 so that the lower end thereof moves forwardly and downwardly until the rollers 34 come into engagement with the ground. The gear is then placed in mesh and the machine driven down a row of plants. The cutter bars come into engagement with the plants, those at the upper end of the tilting frame 32 engaging the plants first, so that the upper ends of the plants are first removed and the plant then removed by sections until it is finally cut off very close to the ground. The cut particles are kicked rearwardly by the fingers 52 so that they do not fall into the plants to lodge thereon and render heavier the progressive work of cutting. It is pointed out that by employing this system not only is it assured that the plant be held steady during the cutting off of the sections, because of the fact that its lower end has not been disturbed, but furthermore but one of the cutters is brought into operation at one time, thus lessening the drag which is placed upon the machine in operation.

It will, of course, be obvious that the structure hereinbefore set forth is capable of a certain range of change and modification without materially departing from the spirit of our invention, and we accordingly do not limit ourselves to such specific structure except as hereinafter claimed.

We claim:—

1. In a stalk cutter, a wheel-supported frame, an upwardly and forwardly inclining frame mounted for tilting movement upon the wheel-supported frame, a plurality of transversely extending cutter members carried by the tilting frame, means for operating said cutting members, means connecting the wheel-supported frame and the tilting frame normally urging the rear end of the tilting frame forwardly, and ground engaging casters carried by the lower end of the tilting frame.

2. In a stalk cutter, a wheel-supported frame, an upwardly and forwardly inclining frame mounted for tilting movement upon the wheel-supported frame, a plurality of transversely extending cutter members carried by the tilting frame, means for operating said cutting members, means connecting the wheel-supported frame and the tilting frame normally urging the rear end of the tilting frame forwardly, ground engaging casters carried by the lower end of the tilting frame, and means for holding the upper end of the tilting frame forwardly against the action of said means and with the casters of the tilting frame out of engagement with the ground.

3. In a stalk cutter, a wheel-supported frame adapted to straddle a row of stalks, an upwardly and forwardly inclining frame pivoted intermediate its ends to the wheel-supported frame, transversely extending cutter members carried by the frame, means operated by movement of the wheel-supported frame along the row for operating the cutter members, ground engaging members carried by the lower end of the tilting frame, and means for yieldably maintaining said ground engaging members in engagement with the ground.

4. In a stalk cutter, a wheel-supported frame adapted to straddle a row of stalks, an upwardly and forwardly inclining frame pivoted intermediate its ends to the wheel-supported frame, transversely extending cutter members carried by the frame, means operated by movement of the wheel-supported frame along the row for operating the cutter members, ground engaging members carried by the lower end of the tilting frame, means for yieldably maintaining said ground engaging members in engagement with the ground, and means for latching the tilting frame with the ground engaging members out of engagement with the ground against the action of said means.

5. In a stalk cutter, a wheel-supported frame adapted to straddle a row of stalks, an upwardly and forwardly inclining frame pivoted intermediate its ends to the wheel-supported frame, transversely extending cutter members carried by the frame, means operated by movement of the wheel-supported frame along the row for operating the cutter members, ground engaging members carried by the lower end of the tilting frame, means for yieldably maintaining said ground engaging members in engagement with the ground, means for latching the tilting frame with the ground engaging members out of engagement with the ground against the action of said means, and means for disconnecting the drive from the cutter members to prevent operation thereof.

6. In a stalk cutter, a wheel-supported frame, a tilting frame carried by the wheel-supported frame, a shaft having its ends supported in bearings at the upper and lower ends of the tilting frame, a driving connection between one of the wheels of the frame and said shaft, means for rendering said driving connection inoperative, cutter members extending transversely of the wheel-supported frame, means for connecting said shaft and cutter members to operate the cutter members, shafts extending transversely of the frame intermediate said cutter members, kicker fingers carried by the last named shafts, a connection between the last named shafts and the first named shaft whereby the last named shafts are rotated, said tilting frame inclining upwardly and rearwardly and being pivoted at its center to the main frame for oscillation thereon, and means normally maintaining the lower end of the tilting frame in engagement with the ground.

7. In a stalk cutter, a wheel-supported frame, a tilting frame carried by the wheel-supported frame, a shaft having its ends supported in bearings at the upper and lower ends of the tilting frame, a driving connection between one of the wheels of the frame and said shaft, means for rendering said driving connection inoperative, cutter members extending transversely of the wheel-supported frame, means for connecting said shaft and cutter members to operate the cutter members, shafts extending transversely of the frame intermediate said cutter members, kicker fingers carried by the last named shafts, a connection between the last named shafts and the first named shaft whereby the last named shafts are rotated, said tilting frame inclining upwardly and rearwardly and being pivoted at its center to the main frame for oscillation thereon, means normally maintaining the lower end of the tilting frame in engagement with the ground, and means for locking the tilting frame in position with its lower end out of engagement with the ground.

In testimony whereof we hereunto affix our signatures.

GEORGE LEE PETERSON.
ROY PETERSON.